US012560297B2

(12) United States Patent
Toko

(10) Patent No.: US 12,560,297 B2
(45) Date of Patent: Feb. 24, 2026

(54) LIGHTING APPARATUS, VEHICLE HEADLIGHT SYSTEM

(71) Applicant: Stanley Electric Co., Ltd., Tokyo (JP)

(72) Inventor: Yasuo Toko, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 18/875,108

(22) PCT Filed: May 16, 2023

(86) PCT No.: PCT/JP2023/018308

§ 371 (c)(1),
(2) Date: Dec. 13, 2024

(87) PCT Pub. No.: WO2023/243294

PCT Pub. Date: Dec. 21, 2023

(65) Prior Publication Data

US 2025/0369584 A1 Dec. 4, 2025

(30) Foreign Application Priority Data

Jun. 13, 2022 (JP) ................................ 2022-095030

(51) Int. Cl.
*F21S 41/64* (2018.01)
*F21S 41/135* (2018.01)
(Continued)

(52) U.S. Cl.
CPC ........... *F21S 41/645* (2018.01); *F21S 41/135* (2018.01); *F21S 41/255* (2018.01); *F21Y 2115/10* (2016.08)

(58) Field of Classification Search
CPC .............................. F21S 41/645; F21S 41/135
See application file for complete search history.

(56) References Cited

U.S. PATENT DOCUMENTS

2016/0077402 A1* 3/2016 Takehara ............. F21S 41/645
349/33
2019/0078749 A1* 3/2019 Toko ..................... F21S 41/645
(Continued)

FOREIGN PATENT DOCUMENTS

JP 5238124 B2 7/2013
JP 2018205764 A 12/2018
(Continued)

OTHER PUBLICATIONS

International Search Report and Written Opinion of the International Search Report for PCT/JP2023/018308 dated Jun. 20, 2023.

*Primary Examiner* — Eric T Eide
(74) *Attorney, Agent, or Firm* — Kenealy Vaidya LLP

(57) ABSTRACT

A lighting apparatus including: a light source; a light condensing unit; a liquid crystal element disposed in a focal position of light condensed by the light condensing unit; a projection lens; a first polarizer disposed between the light source and the LC element; a second polarizer disposed between the LC element and the projection lens; and a diffractive optical element disposed between the light source and the LC element; where the diffractive optical element has light modulation regions switching between a first state in which the refractive index changes and a second state in which the refractive index is uniform, where a diffractive effect is generated with respect to an entering light in the first state, and where each light modulation region is disposed at a position at which the light enters and closer to the light source than the focal position.

8 Claims, 12 Drawing Sheets

(51) Int. Cl.
*F21S 41/255* (2018.01)
*F21Y 115/10* (2016.01)

(56) References Cited

U.S. PATENT DOCUMENTS

| | | | | |
|---|---|---|---|---|
| 2019/0082151 | A1 | 3/2019 | Kishimoto | |
| 2019/0195457 | A1* | 6/2019 | Toko | B60Q 1/1423 |
| 2019/0206350 | A1* | 7/2019 | Toko | G02F 1/133753 |
| 2019/0360655 | A1* | 11/2019 | Toko | G02F 1/1333 |
| 2020/0032977 | A1* | 1/2020 | Toko | F21S 41/645 |

FOREIGN PATENT DOCUMENTS

| | | | |
|---|---|---|---|
| JP | 2021173955 | A | 11/2021 |
| JP | 2022020973 | A | 2/2022 |

* cited by examiner

FIG. 9
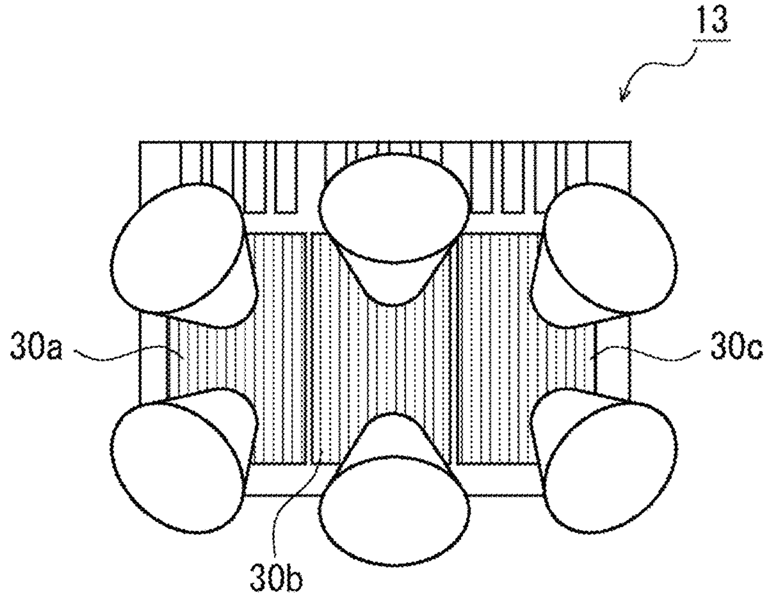
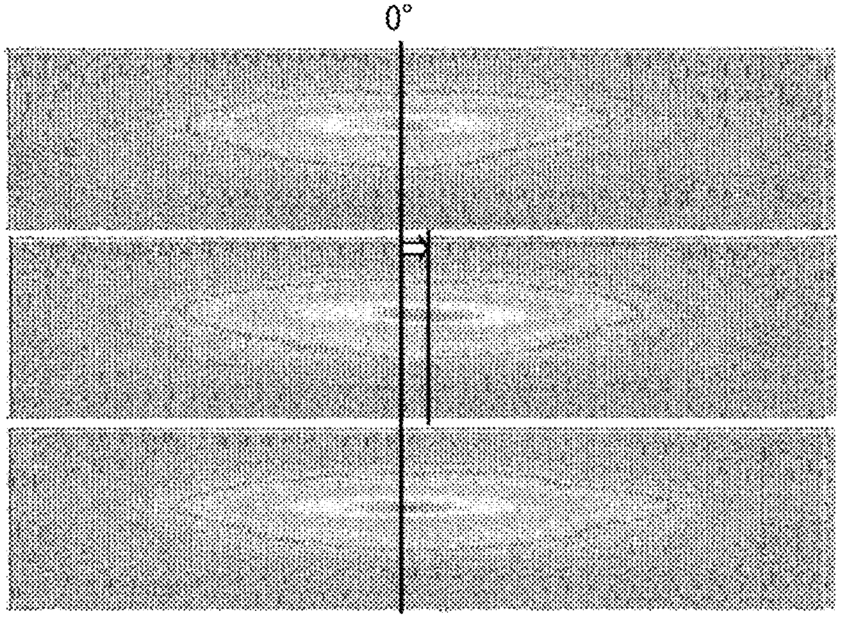
FIG. 10A
FIG. 10B
FIG. 10C

LIGHTING APPARATUS, VEHICLE HEADLIGHT SYSTEM

This application is a U.S. National Stage Application under 35 U.S.C § 371 of International Patent Application No. PCT/JP2023/018308 filed May 16, 2023, which claims the benefit of priority under 35 U.S.C. § 119 to Japanese Patent Application No. 2022-095030 filed Jun. 13, 2022, the disclosures of all of which are hereby incorporated by reference in their entireties.

TECHNICAL FIELD

The present disclosure relates to a lighting apparatus, and a vehicle headlight system.

BACKGROUND ART

Japanese Patent No. 5238124 (Patent Document 1) describes a lamp having a light source, a reflector, and a lens, and further equipped with a liquid crystal optical element disposed between the light source and the lens to enable light distribution control over a wider range than the basic light distribution composed of the light source, reflector, and lens. The liquid crystal optical element of this lamp exhibits a transparent state when no voltage is applied due to the uniformity of the molecular arrangement and refractive index of the adjacent grating and non-grating sections, and when a voltage is applied, the difference in refractive index between the grating and non-grating sections causes the light guided through the liquid crystal layer to be refracted in a specific direction and become scattered light, widening the irradiation direction to the outside.

PRIOR ART DOCUMENT

Patent Document

[Patent Document 1] Japanese Patent No. 5238124

SUMMARY OF THE INVENTION

Technical Problem

In a specific aspect, it is an object of the present disclosure to provide a technology that can realize diversification of light distribution control of irradiation light in a lighting apparatus such as a vehicle lamp or a system that uses such lighting apparatus.

Solution to the Problem (1) A lighting apparatus according to one aspect of the present disclosure is a lighting apparatus including: (a) a light source; (b) a light condensing unit that condenses light emitted from the light source; (c) a liquid crystal element disposed in a focal position of the light that is condensed by the light condensing unit; (d) a projection lens disposed in a position at which the light that passes through the liquid crystal element can enter; (e) a first polarizer disposed between the light source and the liquid crystal element; (f) a second polarizer disposed between liquid crystal element and the projection lens; and (g) a diffractive optical element disposed between the light source and the liquid crystal element; (h) where the diffractive optical element has a plurality of light modulation regions that are individually capable of electrically switching between a first state in which the refractive index changes periodically or continuously and a second state in which the refractive index is substantially uniform, (i) where, in the first state, a diffractive effect can be generated with respect to an entering light, and (j) where each of the plurality of light modulation regions is disposed at a position at which the light can enter, said position being closer to the light source than the focal position.

(2) A vehicle lamp system according to one aspect of the present disclosure is a vehicle lamp system including: (a) a vehicle lamp configured using the lighting apparatus according to the above-described (1), and (b) a controller connected to the vehicle lamp, the controller controlling the operation of the liquid crystal element of the vehicle lamp and the operation of the diffractive optical element in accordance with the conditions around a vehicle.

According to the above configurations, it is possible to realize diversification of light distribution control of irradiation light in a lighting apparatus such as a vehicle lamp or a system that uses such lighting apparatus.

BRIEF DESCRIPTION OF THE DRAWINGS

FIG. 9 is a schematic diagram showing a conical shaped light emitted from a light source, collected by a reflector, and incident on a diffractive optical element.

FIG. 10(A) to FIG. 10(C) are diagrams showing measurement examples of the light intensity distribution of the projection light.

MODE FOR CARRYING OUT THE INVENTION

Figure 1:
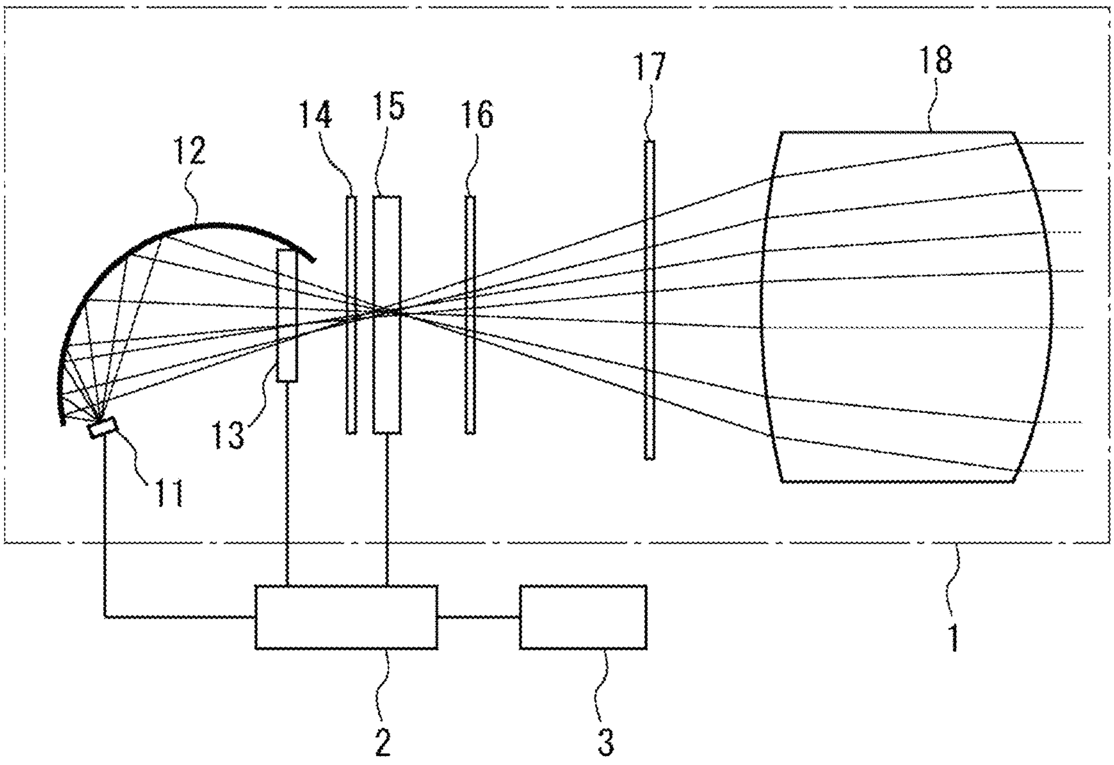
FIG. 1 is a diagram showing a configuration of a vehicle lamp system according to one embodiment.

FIG. 1 is a diagram showing the configuration of a vehicle lamp system according to one embodiment. The vehicle lamp system shown in FIG. 1 is configured to include a vehicle lamp (a lighting apparatus) 1, a controller 2, and a camera 3. This vehicle lamp system detects the positions of the vehicles in front, faces of pedestrians or the like around the own vehicle (i.e., the situation around the vehicle) based on images of the vehicle's surroundings captured by the camera 3, and based on the detection results, sets a certain range including the positions of the vehicles in front, etc. as a dimming range (or non-irradiation range), and sets the other range as a light irradiation range to selectively irradiate light, and further irradiates various shapes of light onto the road surface.

The vehicle lamp 1 is arranged at a predetermined position at the front of the vehicle for example and forms irradiation light for irradiating the front of the vehicle. Here, although one vehicle lamp 1 is provided on each of the left and right sides of the front portion of the vehicle, only one lamp is illustrated here.

The controller 2 controls the operation of a light source 11, a diffractive optical element 13, and a liquid crystal element 15 of the vehicle lamp 1. This controller 2 is realized by using a computer system having, for example, a CPU (Central Processing Unit), a ROM (Read Only Memory), a RAM (Random Access Memory), etc., and by executing a predetermined operating program in the computer system. The controller 2 of the present embodiment turns on the light source 11 according to the operating state of a light switch (not shown) installed near a driver's seat, sets a light distribution pattern according to objects such as a forward vehicle (an oncoming vehicle, a preceding vehicle), a pedestrian, a road sign, a white line on the road, or the like detected by the camera 3, and provides a control signal to the liquid crystal element 15 for forming an image corresponding to this light distribution pattern.

The camera 3 photographs the space in front of the vehicle to generate an image and performs predetermined image recognition processing on this image to detect the position, range, size, type, etc. of the object such as the forward vehicle. The detection result obtained by the image recognition processing is supplied to the controller 2 which is connected to the camera 3. The camera 3 is installed at a predetermined position inside the vehicle (for example, upper portion of the windshield) or at a predetermined position outside the vehicle (for example, inside the front bumper). If the vehicle is equipped with a camera for other purposes (for example, an automatic braking system, etc.), the camera may be shared.

Here, note that the function of image recognition processing of the camera 3 may be replaced by the controller 2. In this case, the camera 3 outputs the generated image to the controller 2, and image recognition processing is performed on the controller 2 side based on this image. Alternatively, both the image and the result of image recognition processing based on the image may be supplied from the camera 3 to the controller 2. In this case, the controller 2 may further perform its own image recognition processing using the image obtained from the camera 3.

The vehicle lamp 1 shown in FIG. 1 is configured to include a light source 11, a reflector (reflective member) 12, a diffractive optical element 13, a polarizer 14, a liquid crystal element 15, an optical compensator 16, a polarizer 17, and a projection lens 18. Each of these elements is housed and integrated in one housing (case body), for example. Further, the light source 11, the diffractive optical element 13, and the liquid crystal element 15 are each connected to the controller 2, and the operations are controlled by the controller 2.

The light source 11 includes a drive circuit and emits light under the control of the controller 2. As an example, this light source 11 is a white LED equipped with a blue LED and a yellow phosphor placed at a position where the light emitted by the blue LED is incident, and the blue LED excites the yellow phosphor, and white light is obtained by mixing the blue and yellow colors.

The reflector 12 is disposed in correspondence with the light source 11, and reflects and condenses light emitted from the light source 11 at the position of the liquid crystal element 15 (for example, approximately at the center in the thickness direction of the liquid crystal element 15), and causes the light to enter the liquid crystal element 15. The reflector 12 is a reflecting mirror having an ellipsoidal reflecting surface, for example. In this case, the light source 11 can be placed near the focal point of the reflective surface of the reflector 12. Here, instead of the reflector 12, a lens may be used as a light condensing unit.

The diffractive optical element 13 operates under the control of the controller 2, and uses the diffractive effect (diffractive phenomenon) of light to widen or narrow the width of the entering light, or to change the direction of travel of the entering light. The detailed structure of the diffractive optical element 13 will be described later.

The polarizer 14 is disposed on the light incident side of the liquid crystal element 15. The polarizer 17 is disposed on the light emitting side of the liquid crystal element 15. These polarizer 14, polarizer 17, and the liquid crystal element 15 disposed therebetween form an image corresponding to the light distribution pattern of the light irradiated forward of the vehicle. As an example, the transmission axes of the polarizers 14 and 17 are disposed so as to be approximately perpendicular to each other. Further, the transmission axes of the polarizers 14 and 17 are disposed so as to be at an angle of approximately 45° in a plane view with respect to the alignment direction when no voltage is applied at approximately the center of the layer thickness direction of the liquid crystal layer of the liquid crystal element 15.

The liquid crystal element 15 is disposed at a position that includes the focal point of the light reflected and condensed by the reflector 12, and is disposed so that the light is incident thereon. The liquid crystal element 15 includes a plurality of pixel portions (light modulation portions) that can be controlled independently of each other. In the present embodiment, the liquid crystal element 15 includes a driver (not shown) for applying a drive voltage to each pixel portion. The driver applies a drive voltage to the liquid crystal element 15 to individually drive each pixel portion based on a control signal supplied from the controller 2. As shown by a rough trajectory (optical path) of the light emitted from the light source 11 with a thin line in the figure, the light incident on the liquid crystal element 15 is incident at a wide angle on the light incident surface side of the liquid crystal element 15. Specifically, the light is incident at a wide angle of about 40° to 60° with respect to the normal direction of the light incident surface.

The optical compensator 16 is for compensating phase difference of the light transmitted through the liquid crystal element 15 and is for increasing the degree of polarization, and is disposed on the light emitting surface side of the liquid crystal element 15. Specifically, phase difference of the optical compensator 16 is set so that the sum of phase difference of the optical compensator and phase difference of the liquid crystal layer 15 becomes 0 or a value close to zero. Here, note that the optical compensator 16 may be omitted.

The projection lens 18 is disposed at a position where the light reflected and condensed by the reflector 12 and transmitted through the liquid crystal element 15 can be incident, and projects this incident light forward of the vehicle. The projection lens 18 is disposed so that its focal point is formed at the liquid crystal layer of the liquid crystal element 15.

Figure 2:
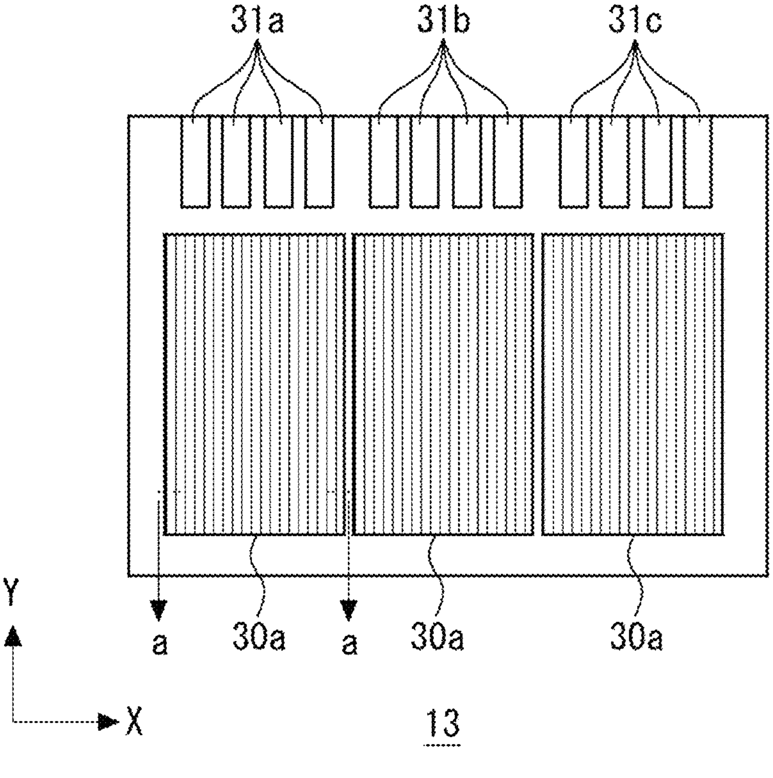
FIG. 2 is a schematic plane view for explaining an example of the structure of a diffractive optical element.

FIG. 2 is a schematic plane view for explaining an example of the structure of a diffractive optical element. The illustrated diffractive optical element 13 is configured to include three light modulation regions 30*a*, 30*b*, and 30*c* arranged along the X direction in the figure, four terminal portions 31*a* for applying a drive voltage to the light modulation region 30*a*, four terminal portions 31*b* for applying a drive voltage to the light modulation region 30*b*, and four terminal portions 31*c* for applying a drive voltage to the light modulation region 30*c*. The light modulation regions 30*a*, 30*b*, and 30*c* are arranged, for example, along the left-right direction (horizontal direction) of the vehicle. Here, in the figure, gaps are drawn between each light modulation region 30*a*, etc. to make it easier to distinguish between each light modulation region 30*a*, 30*b*, 30*c*, but in reality, each light modulation region 30*a*, etc. may be provided without these gaps.

The light modulation region 30*a* operates by a driving voltage input using each terminal portion 31*a*, and mainly uses a diffraction effect to bend the direction of travel of the entering light or to widen the width of the entering light. Similarly, the light modulation region 30*b* operates by a driving voltage input using each terminal portion 31*b*, and mainly uses a diffraction effect to bend the direction of travel of the entering light or to widen the width of the entering light. Similarly, the light modulation region 30*c* operates by a driving voltage input using each terminal portion 31*c*, and mainly uses a diffraction effect to bend the direction of travel of the entering light or to widen the width of the entering light. Here, in any of the light modulation regions 30*a*, etc., refraction may also occur in addition to diffraction.

Figure 3A:
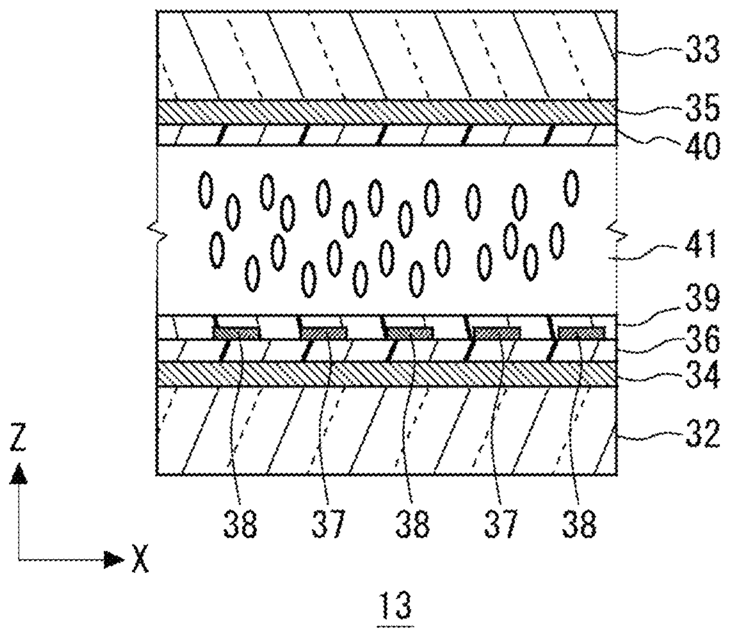
FIG. 3(A) is a cross-sectional view schematically showing a cross-sectional structure of a portion of the diffractive optical element taken along line a-a in FIG. 2.

FIG. 3(A) is a cross-sectional view schematically showing a cross-sectional structure of a portion of the diffractive optical element taken along line a-a in FIG. 2. Here, the cross-sectional structure of a portion of the light modulation region 30*a* will be described, but note that the cross-sectional structures of the other light modulation regions 30*b* and 30*c* are similar. The light modulation region 30*a* in the diffractive optical element 13 of the present embodiment is configured to include a first substrate 32 and a second substrate 33 arranged opposite each other, a common electrode 34, a counter electrode 35, an insulating film 36, comb-shaped electrodes 37 and 38, alignment films 39 and 40, and a liquid crystal layer 41.

The first substrate 32 and the second substrate 33 are each rectangular substrates in a plane view for example, and are disposed opposite each other. The first substrate 32 and the second substrate 33 are each transparent substrates such as glass substrates or plastic substrates, for example. Spherical spacers (not shown) made of resin or the like for example are dispersed between the first substrate 32 and the second substrate 33, and the substrate gap is maintained at a desired size (for example, about several μm) by these spherical spacers. Here, instead of the spherical spacers, columnar bodies made of resin or the like for example may be provided on the first substrate 32 side or the second substrate 33 side, and these may be used as spacers.

The common electrode 34 is provided on one surface side of the first substrate 32 closer to the one surface side than the comb-shaped electrodes 37, 38, and is disposed so as to overlap with the comb-shaped electrodes 37, 38 in a plane view. The counter electrode 35 is provided on one surface side of the second substrate 33, and is disposed so as to overlap with the comb-shaped electrodes 37, 38 in a plane view. The common electrode 34 and the counter electrode 35 are formed by appropriately patterning a transparent conductive film such as indium tin oxide (ITO). The common electrode 34 and the counter electrode 35 are each provided in a region that approximately coincides with the outer edge of the light modulation region 30*a* in a plane view.

The common electrode 34 and the counter electrode 35 are each connected to one of the terminal portions 31*a* described above, and the applied voltage can be controlled independently for each. Here, each terminal portion 31*a* is provided on the first substrate 32, for example. In this case, the counter electrode 35 and the corresponding terminal portion 31*a* are electrically connected to each other via an anisotropic conductive film (not shown) provided at an appropriate position between the first substrate 32 and the second substrate 33, for example.

The insulating film 36 is provided on one surface side of the first substrate 32 between the common electrode 34 and each of the comb-shaped electrodes 37, 38 so as to cover the common electrode 34. This insulating film 36 is a film for achieving electrical insulation between the common electrode 34 and each of the comb-shaped electrodes 37, 38. As the insulating film 36, a siloxane-based insulating film, an acrylic-based organic insulating film, or an inorganic insulating film such as a SiNx film or a SiOx film can be used, for example. Here, this insulating film 36 is provided by patterning so as to expose each terminal portion 31*a* without covering them.

Each comb-shaped electrode 37, 38 is provided on one surface side of the first substrate 32, on the upper side of the insulating film 36 (the side facing the second substrate 33). These comb-shaped electrodes 37, 38 are formed by appropriately patterning a transparent conductive film such as indium tin oxide (ITO). Each comb-shaped electrode 37, 38 is disposed so as to overlap the liquid crystal layer 41 in a plane view.

The alignment film 39 is disposed above the comb-shaped electrodes 37, 38 on one surface side of the first substrate 32 so as to cover the comb-shaped electrodes 37, 38. The alignment film 40 is disposed above the counter electrode 35 on one surface side of the second substrate 33 so as to cover the counter electrode 35. These alignment films 39, 40 are intended to regulate the alignment state of the liquid crystal layer 41. Each alignment film 39, 40 is subjected to a uniaxial alignment treatment, such as a rubbing treatment, and has a uniaxial alignment regulating force that determines the alignment of the liquid crystal molecules in the liquid crystal layer 41 along its direction. The alignment treatment direction of each alignment film 39, 40 is set to be staggered (anti-parallel), for example. As each of the alignment films 39 and 40, for example, a horizontal alignment film or a vertical alignment film is appropriately used. For example, a polyimide alignment film or a siloxane-based alignment film may be used.

The liquid crystal layer 41 is provided between the first substrate 32 and the second substrate 33. The liquid crystal layer 41 is made of a nematic liquid crystal material having fluidity, for example. The liquid crystal layer 41 may be composed using a liquid crystal material having negative dielectric anisotropy, or may be composed using a liquid crystal material having positive dielectric anisotropy. The layer thickness of the liquid crystal layer 41 may be about 4 μm, for example.

Figure 3B:
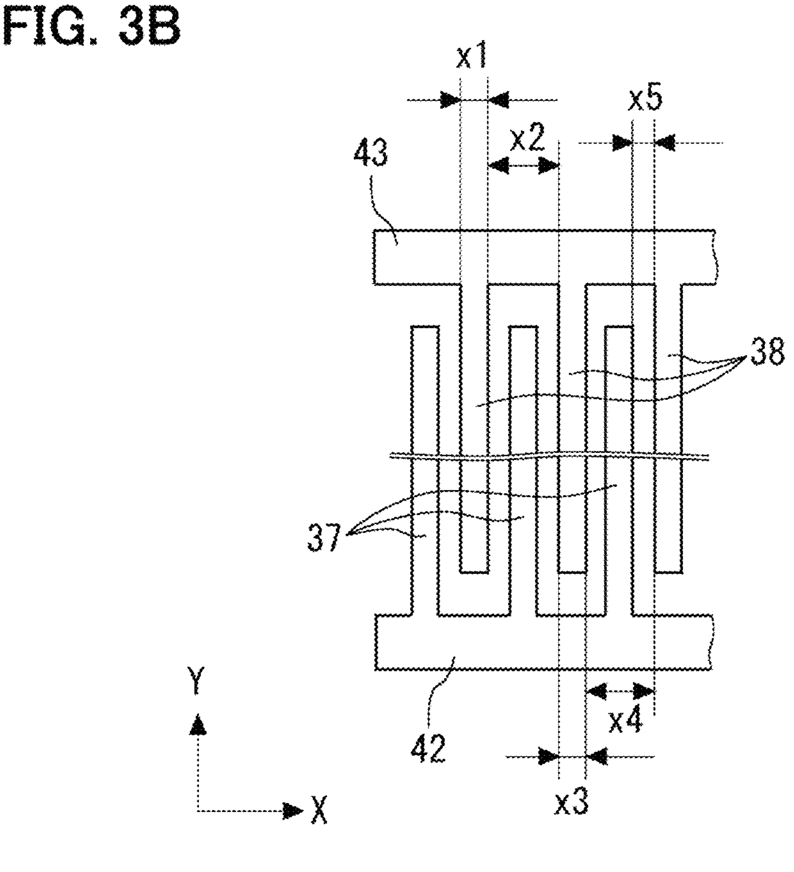
FIG. 3(B) is a schematic plane view for explaining an example of the structure of the comb-shaped electrodes of the diffractive optical element.

FIG. 3(B) is a schematic plane view for explaining an example of the structure of the comb-shaped electrodes of the diffractive optical element. As shown in the figure, the comb-shaped electrodes 37 and 38 are each configured to include a plurality of electrode branches extending along the Y direction in the figure, and the electrode branches are disposed alternately one by one along the X direction in the figure. Here, the X direction and Y direction in FIG. 3(B) correspond to the X direction and Y direction in FIG. 2. Further, the X direction corresponds to the left-right direction (horizontal direction) of the vehicle, and the Y direction corresponds to the up-down direction (vertical direction) of the vehicle. Further, the X direction and Y direction are directions that are approximately perpendicular to the layer thickness direction of the liquid crystal layer 41 of the diffractive optical element 13. The comb-shaped electrode 37 is connected to a wiring portion 42, and is connected to one of the above-described terminal portions 31*a* via this wiring portion 42. The comb-shaped electrode 38 is connected to a wiring portion 43, and is connected to one of the above-described terminal portions 31*a* via this wiring portion 43.

The comb-shaped electrode 37 has an X-direction length (x1) of each electrode branch of 5 μm or less for example, and the distance between adjacent electrode branches (x2) is 15 μm or less for example. Similarly, the comb-shaped electrode 38 has an X-direction length (x3) of each electrode branch of 5 μm or less for example, and the distance between adjacent electrode branches (x4) is 15 μm or less for example. Further, the distance between one electrode branch of the comb-shaped electrode 37 and one electrode branch of the adjacent comb-shaped electrode 38 (x5) is 5 μm or less, for example. In order to generate a diffractive effect in the diffractive optical element 13, it is particularly preferable that the X-direction length (x1) of each electrode branch is 5 μm or less, and the mutual distance (x5) between one electrode branch of the comb-shaped electrode 37 and one electrode branch of the adjacent comb-shaped electrode 38 is 5 μm or less.

In order to generate a more pronounced diffractive effect in the diffractive optical element 13, it is desirable to set the above-described x1, x2, x3, x4, and x5 to smaller values. Thereby, when a voltage is applied to the liquid crystal layer 41 using each of the comb-shaped electrodes 37 and 38, the common electrode 34, and the counter electrode 35, a state can be generated in which the refractive index in the liquid crystal layer 41 changes periodically at a length equal to or less than the wavelength of visible light. By irradiating light to the diffractive optical element 13 in this state, it becomes possible to generate a diffractive effect independently in each of the above-described light modulation regions 30*a*, 30*b*, and 30*c*, making it possible to bend the direction of light travel and spread the light as a whole.

Here, the relationship among the positive and negative dielectric anisotropy of the liquid crystal layer 41, the type of alignment film (vertical/horizontal), the alignment direction of the alignment film, and the extension direction of each electrode branch of the comb-shaped electrodes 37 and 38 will be described. First, when a vertical alignment film is used as the alignment film, there is no particular limitation on the alignment direction relative to the extension direction of each electrode branch (Y direction in the illustrated example). Further, the dielectric anisotropy of the liquid crystal layer 41 may be positive or negative. In a liquid crystal element for normal display purposes, etc., it is difficult to cause an alignment change in the liquid crystal layer 41 when a liquid crystal material with positive dielectric anisotropy is used under these conditions, but it has been confirmed that it is possible to operate in a diffractive optical element 13 using comb-shaped electrodes 37 and 38 as in the present embodiment.

Next, when a horizontal alignment film is used as the alignment film and the dielectric anisotropy of the liquid crystal layer 41 is positive, it is desirable that the alignment treatment direction is not perpendicular to the extension direction of each electrode branch (Y direction in the illustrated example), and it is desirable that the alignment treatment direction is parallel or at 45° to the extension direction, for example. Further, when a horizontal alignment film is used as the alignment film and the dielectric anisotropy of the liquid crystal layer 41 is negative, it is desirable that the alignment treatment direction is not parallel to the extension direction of each electrode branch (Y direction in the illustrated example), and it is desirable that the alignment treatment direction is perpendicular or at 45° to the extension direction, for example.

Figure 4:
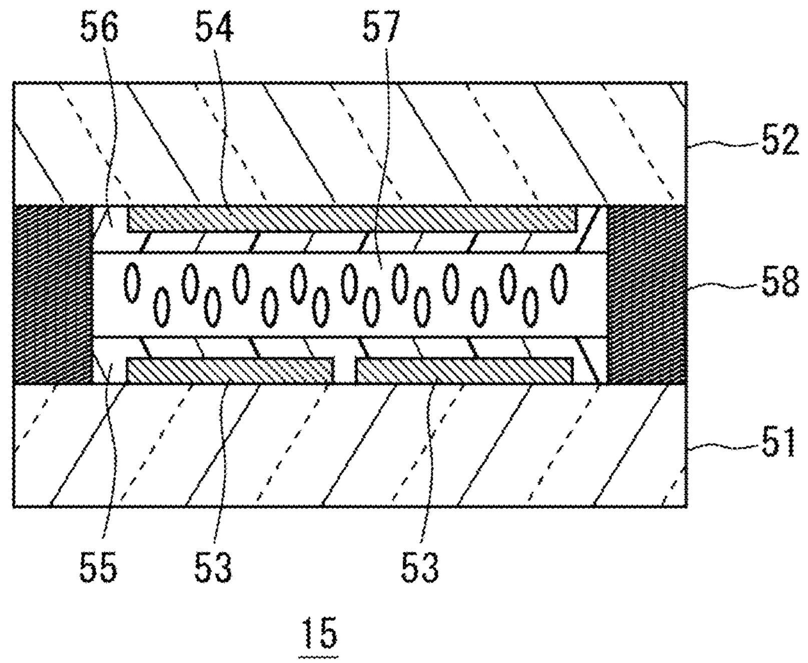
FIG. 4 is a schematic cross-sectional view for explaining an example of the structure of a liquid crystal element.

FIG. 4 is a schematic cross-sectional view for explaining an example of the structure of a liquid crystal element. Here, a segment display type liquid crystal element is shown as an example. Specifically, the example liquid crystal element 15 is configured to include a first substrate 51 and a second substrate 52 arranged opposite each other, a plurality of pixel electrodes 53, a counter electrode 54, alignment films 55 and 56, a liquid crystal layer 57, and a sealant 58.

The first substrate 51 and the second substrate 52 are rectangular substrates in a plane view, and are arranged opposite each other, for example. Spherical spacers (not shown) made of a resin film are distributed between the first substrate 51 and the second substrate 52 for example, and these spherical spacers maintain a gap between the substrates at a desired size (for example, about a few μm).

Here, instead of spherical spacers, columnar bodies made of resin or the like may be provided on the first substrate 51 side or the second substrate 52 side and used as spacers. In the present embodiment, it is arranged such that the first substrate 51 faces the polarizer 14, and the second substrate 52 faces the polarizer 17. That is, the second substrate 52 side is the light emitting side of the liquid crystal element 15, and the first substrate 51 side is the light entrance side of the liquid crystal element 15.

Multiple pixel electrodes 53 are provided on one surface side of the first substrate 51. These pixel electrodes 53 are formed by appropriately patterning a transparent conductive film such as indium tin oxide (ITO). In the present embodiment, a pixel portion is formed in the portion where each pixel electrode 53 faces the counter electrode 54.

The counter electrode 54 is provided on one surface side of the second substrate 52. This counter electrode 54 is provided integrally with and faces each pixel electrode 53 of the first substrate 51. The counter electrode 54 is formed by appropriately patterning a transparent conductive film such as indium tin oxide (ITO).

The alignment film 55 is disposed above each pixel electrode 53 on one surface side of the first substrate 51 so as to cover the pixel electrodes 53. The alignment film 56 is disposed above the counter electrodes 54 on one surface side of the second substrate 52 so as to cover the counter electrodes 54. These alignment films 55, 56 are intended to regulate the alignment state of the liquid crystal layer 57. Each alignment film 55, 56 is subjected to a uniaxial alignment process such as rubbing treatment, and has a uniaxial alignment regulation force that regulates the alignment of the liquid crystal molecules in the liquid crystal layer 57 along its direction. The alignment process direction of each alignment film 55, 56 is set to be staggered (anti-parallel), for example. The pretilt angle near the interface between each alignment film 55, 56 and the liquid crystal layer 57 is about 89°, for example. As an example, in the present embodiment, an alignment film made of alicyclic polyimide or alicyclic polyamic acid is used.

The liquid crystal layer 57 is provided between the first substrate 51 and the second substrate 52. The liquid crystal layer 57 is made of a nematic liquid crystal material having fluidity, for example. The liquid crystal layer 57 is made of a liquid crystal material having negative dielectric anisotropy, for example. The thickness of the liquid crystal layer 57 can be about 4 μm, for example.

The sealant 58 is disposed between the first substrate 51 and the second substrate 52 so as to surround the liquid crystal layer 57, thereby sealing the liquid crystal layer 57.

Here, the internal structure and driving method of the liquid crystal element 15 are not particularly limited, so long as the transmitted light can be freely modulated to form a desired image. For example, the liquid crystal element may be configured as an active matrix type in which a thin film transistor is associated with each pixel portion, or as a simple matrix type in which multiple stripe-shaped transparent electrodes are arranged opposite each other and each overlapping area of the transparent electrodes is used as a pixel portion. Further, the liquid crystal element 15 may be a segment display type liquid crystal element having multiple pixel electrodes of any shape provided on one substrate and one (or multiple) counter electrodes provided on the other substrate, and in this case, the driving method may be either multiplex driving or static driving.

Figure 5:
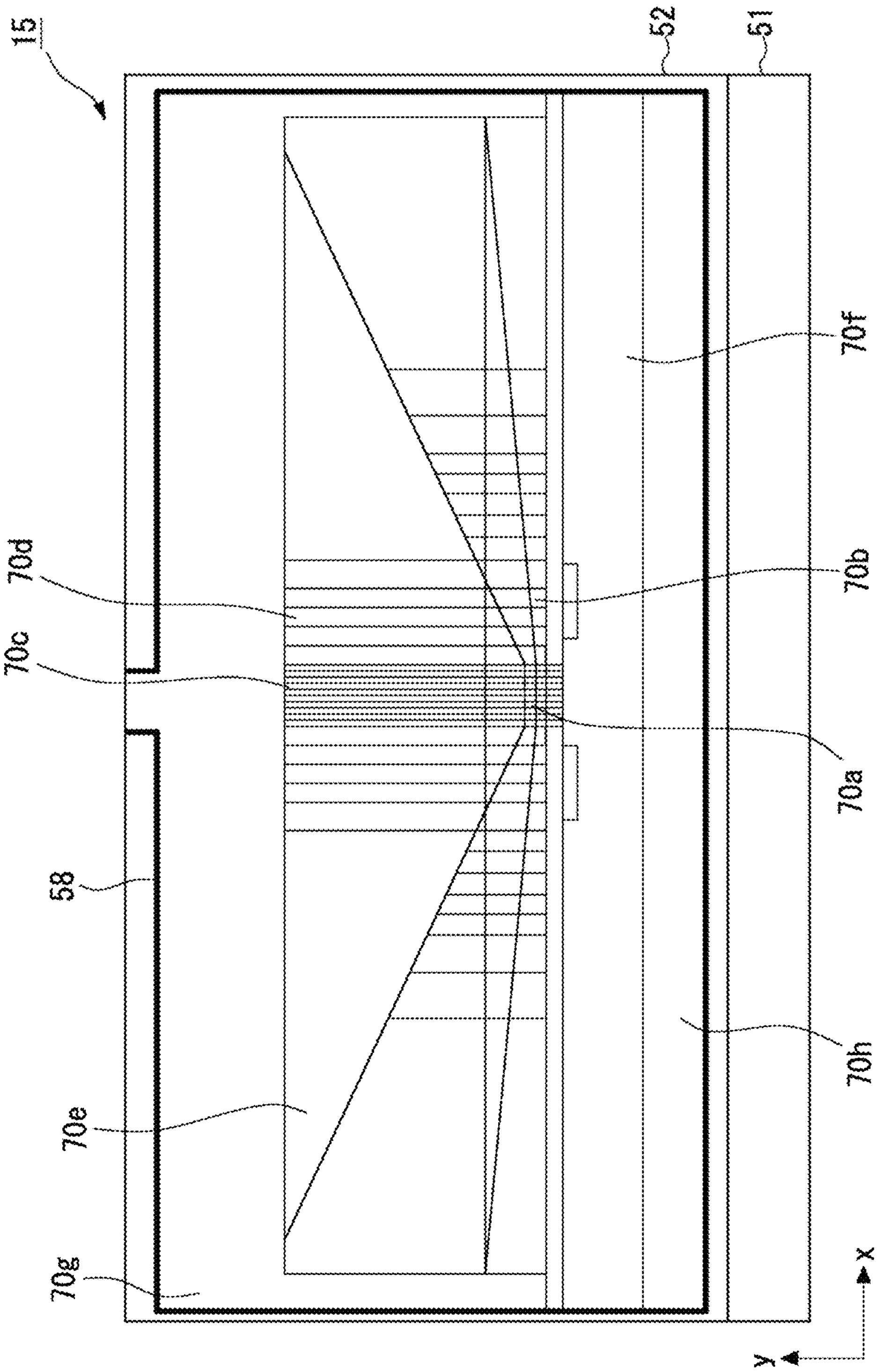
FIG. 5 is a schematic plane view for explaining a more specific embodiment of a liquid crystal element.

FIG. 5 is a schematic plane view for explaining a more specific embodiment of a liquid crystal element. The liquid crystal element 15 of the illustrated embodiment has a plurality of pixel portions (segment regions), which are disposed within an effective display region, which is an inner region surrounded by a sealant 58 in a plane view. Each of the rectangular and triangular regions of various sizes in the illustrated liquid crystal element 15 corresponds to a pixel. In the figure, some pixel portions are shown by reference numerals as examples. In this embodiment, the pixel electrodes (described below) that constitute each pixel are provided in approximately the same shape as each pixel portion.

For example, pixel portion 70*a* is a small square area pixel portion with small length in both the x direction and y direction. Pixel portion 70*b* is a trapezoidal pixel portion with a larger x-directional length than pixel portion 70*a* and a slightly larger y-directional length than pixel portion 70*a*. Pixel portion 70*c* is a vertically long rectangular pixel portion with a smaller x-directional length and a relatively larger y-directional length. Pixel portion 70*d* is a vertically long rectangular pixel portion with a smaller x-directional length than pixel portion 70*b*. Pixel portion 70*e* is a triangular pixel portion with a relatively large x-directional length and y-directional length (length of one side). Pixel portion 70*f* is a large-area horizontally long pixel portion with a very large x-directional length. Pixel portion 70*g* is a vertically long rectangular pixel portion. Pixel portion 70*h* is a horizontally long pixel portion with a very large x-directional length. Here, as shown in the figure, the liquid crystal element 15 is provided with pixel portions of various sizes and shapes other than those exemplified. Each pixel portion 70*a* or the like can individually control the light transmission or non-transmission, and by controlling these appropriately, it is possible to form irradiation light with various light distribution patterns according to the situation ahead of the vehicle.

Figure 6:
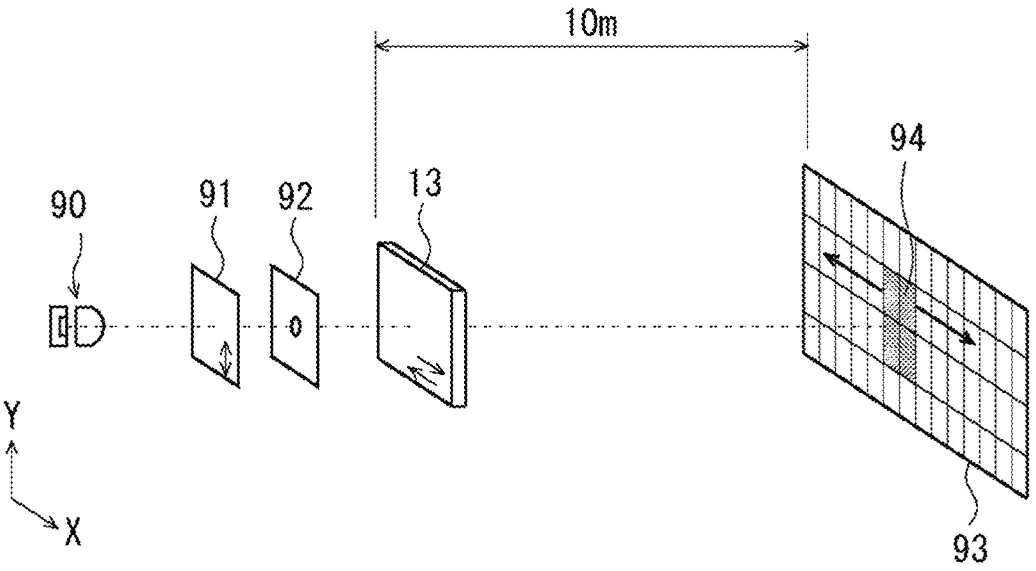
FIG. 6 is a diagram for explaining the configuration of an optical system used to examine the driving conditions of a diffractive optical element.

FIG. 6 is a diagram for explaining the configuration of an optical system used to examine the driving conditions of a diffractive optical element. The optical system shown in FIG. 6 is configured to include a light source 90 that emits collimated light, a polarizer 91 disposed in the traveling direction of the light emitted from the light source 90, an aperture plate 92 having an aperture for narrowing the light transmitted through the polarizer 91, a diffractive optical element 13 disposed at a position where the light that has passed through the aperture plate 92 can be incident, and a screen 93 onto which the light emitted from the diffractive optical element 13 is irradiated. The transmission axis of the polarizer 91 is the Y direction shown in the figure. The diameter of the aperture of the aperture plate 92 is 5 mm. The alignment direction of the diffractive optical element 13 is the X direction shown in the figure (the direction perpendicular to the transmission axis of the polarizer 91), and is arranged in an anti-parallel configuration. The distance between the diffractive optical element 13 and the screen 93 is 10 m.

Using the above optical system, the degree of spread of light 94 that passes through the diffractive optical element 13 and is irradiated onto the screen 93 was examined to see if it differs depending on the driving method of the diffractive optical element 13. The diffractive optical element 13 used in the examination had x1 of the comb-shaped electrodes 37 and 38 of 5 μm and x2 of 15 μm, x3 of the comb-shaped electrode 38 of 5 μm and x4 of 15 μm, and the distance x5 between the electrode branches of the comb-shaped electrodes 37 and 38 of 5 μm. Further, the thickness of the liquid crystal layer 41 was 4 μm, and the liquid crystal material used had a negative dielectric anisotropy and a refractive index anisotropy of 0.18. Vertical alignment films were used for each of the alignment films 39 and 40, and the alignment process was performed by rubbing treatment, and the alignment process direction (rubbing direction) was approximately perpendicular to the extension direction of each electrode branch of the comb-shaped electrodes 37 and 38, and the electrodes were arranged in an anti-parallel manner. There are no particular limitations on the refractive index anisotropy, however it is preferably 0.15 or more, and more preferably 0.2 or more.

Figure 7A:
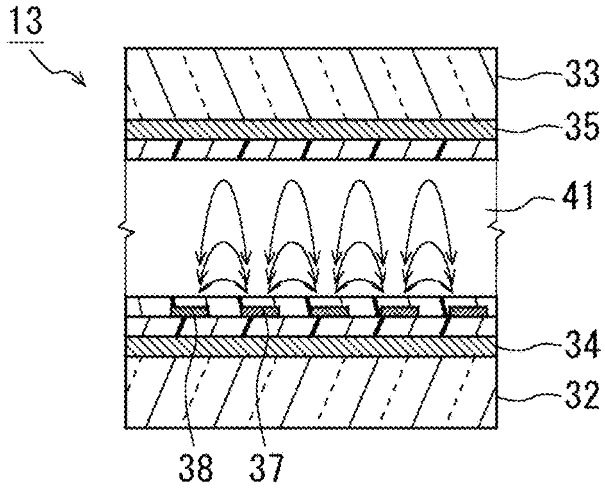
FIG. 7(A) to FIG. 7(C) are diagrams for explaining a driving method of a diffractive optical element.
Figure 7B:
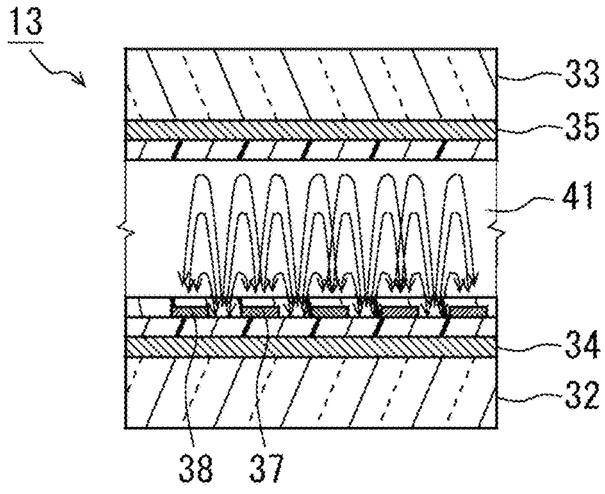
Figure 7C:
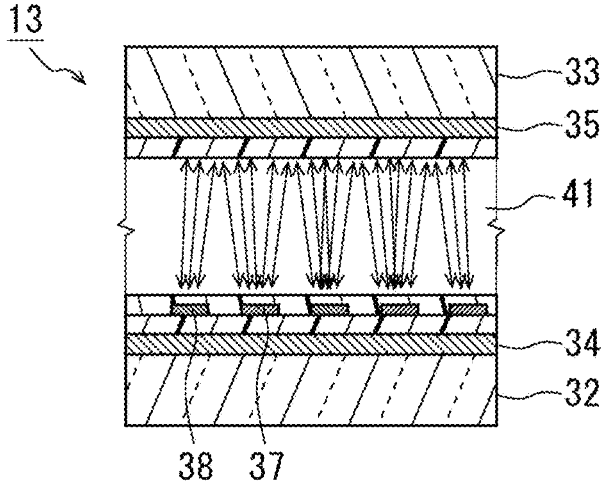

FIG. 7(A) to FIG. 7(C) are diagrams for explaining a driving method of a diffractive optical element. FIG. 7(A) shows a driving method in which a voltage is applied between the comb-shaped electrodes 37 and 38. As the electric field distribution is simply shown by thin lines in the figure, an electric field is generated in the region between the comb-shaped electrodes 37 and 38, and the alignment of the liquid crystal layer 41 changes in that region. In the regions overlapping with each of the comb-shaped electrodes 37 and 38, almost no alignment change occurs. As a result, regions in which the alignment is changed by the electric field and regions in which the alignment is not changed are generated alternately, so that regions with different refractive index distributions can be obtained. Here, when no voltage is applied, such a refractive index distribution does not occur, and the liquid crystal layer 41 is aligned uniformly.

FIG. 7(B) shows a driving method in which a voltage is applied between each of the comb-shaped electrodes 37 and 38 and the common electrode 34. As the electric field distribution is simply shown by thin lines in the figure, an electric field is generated in each region between the comb-shaped electrode 37 and the common electrode 34, and between the comb-shaped electrode 38 and the common electrode 34, and the alignment of the liquid crystal layer 41 changes in the corresponding regions. Alignment changes are unlikely to occur in the regions midway between the electrode branches of the comb-shaped electrodes 37 and 38. As a result, since regions where alignment changes due to the electric field occur alternate with regions where alignment changes do not occur, it is possible to obtain regions with different refractive index distributions. Regions with different refractive index distributions can be obtained at shorter intervals than the driving method shown in the above-described FIG. 7(A). Here, when no voltage is applied, such a refractive index distribution does not occur, and the liquid crystal layer 41 is aligned uniformly.

FIG. 7(C) shows a driving method in which a voltage is applied between each of the comb-shaped electrodes 37 and 38 and the counter electrode 35. As the electric field distribution is simply shown by thin lines in the figure, an electric field is generated in each region between the comb-shaped electrode 37 and the counter electrode 35, and between the comb-shaped electrode 38 and the common electrode 34, causing an alignment change of the liquid crystal layer 41 in the corresponding regions. In this driving method, an electric field is generated in the thickness direction of the liquid crystal layer 41. Since an oblique electric field is generated in the region between each of the comb-shaped electrodes 37 and 38, an alignment state different from that in the region overlapping with each of the comb-shaped electrodes 37 and 38 is obtained. As a result, it is possible to obtain regions with different refractive index distributions. Here, when no voltage is applied, such a refractive index distribution does not occur, and the liquid crystal layer 41 is aligned uniformly.

When only the driving method shown in FIG. 7(A) is used, the common electrode 34 and the counter electrode 35 may be omitted from the diffractive optical element 13. When only the driving method shown in FIG. 7(B) is used, the counter electrode 35 may be omitted from the diffractive optical element 13. When only the driving method shown in FIG. 7(C) is used, the common electrode 34 may be omitted from the diffractive optical element 13. Further, when the driving methods shown in FIG. 7(B) and FIG. 7(C) are used, the comb-shaped electrodes 37 and 38 are given the same potential, so they may be electrically connected. Specifically, the wiring portions 42 and 43 (refer to FIG. 3(B)) may be formed so that they are physically connected at appropriate positions such as their end portions.

Figure 8A:
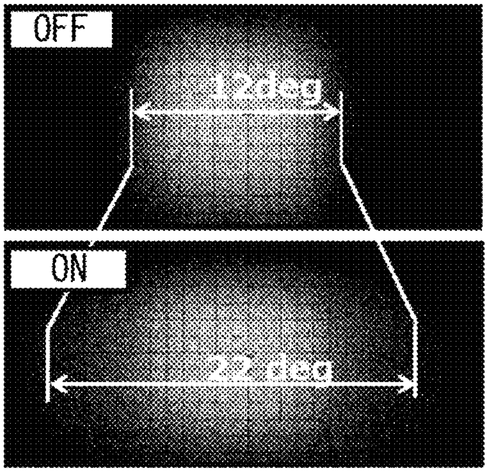
FIG. 8(A) to FIG. 8(C) are diagrams showing measurement examples of light transmitted through a diffractive optical element.
Figure 8B:
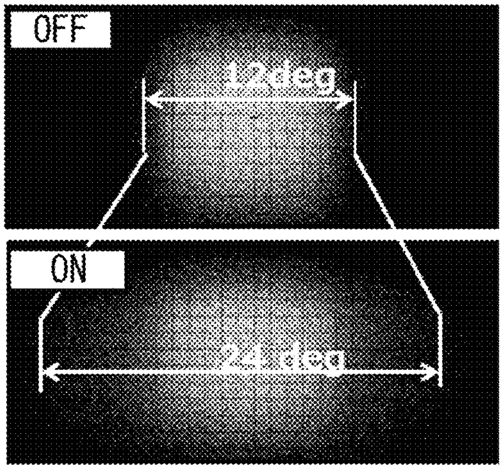
Figure 8C:
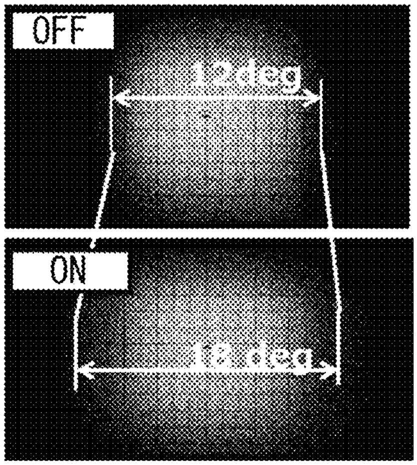

FIG. 8(A) to FIG. 8(C) are diagrams showing measurement examples of light transmitted through a diffractive optical element. Here, the optical system shown in FIG. 6 described above is used, and light is made to enter the central light modulation region 30*b* in the left-right direction (X direction in FIG. 6) of the diffractive optical element 13, and an observed image of light 94 irradiated onto the screen 93 is shown. In each driving method, a voltage of 10 V at 150 Hz was applied to the comb-shaped electrodes 37 and 38 of the diffractive optical element 13, and a reference voltage (GND voltage) was applied to the common electrode 34 and the counter electrode 35.

FIG. 8(A) shows an example of light measurement when the diffractive optical element 13 is driven by a driving method in which a voltage is applied between the comb-shaped electrode 37 and the comb-shaped electrode 38. As shown in the figure, the width of the light 94 on the screen 93 when no voltage was applied to the diffractive optical element 13 (OFF) was 12 deg, whereas the width of the light 94 on the screen 93 when a voltage was applied between the comb-shaped electrode 37 and the comb-shaped electrode 38 of the diffractive optical element 13 (ON) was widened to 22 deg.

FIG. 8(B) shows an example of light measurement when the diffractive optical element 13 is driven by a driving method in which a voltage is applied between each of the comb-shaped electrodes 37 and the comb-shaped electrode 38 and the common electrode 34. As shown in the figure, the width of the light 94 on the screen 93 when no voltage was applied to the diffractive optical element 13 (OFF) was 12 deg, whereas the width of the light 94 on the screen 93 when a voltage was applied between the comb-shaped electrode 37 and the comb-shaped electrode 38 of the diffractive optical element 13 and the common electrode 34 (ON) was widened to 24 deg.

FIG. 8(C) shows an example of light measurement when the diffractive optical element 13 is driven by a driving method in which a voltage is applied between each of the comb-shaped electrodes 37 and the comb-shaped electrode 38 and the counter electrode 35. As shown in the figure, the width of the light 94 on the screen 93 when no voltage was applied to the diffractive optical element 13 (OFF) was 12 deg, whereas the width of the light 94 on the screen 93 when a voltage was applied between the comb-shaped electrode 37 and the comb-shaped electrode 38 of the diffractive optical element 13 and the counter electrode 35 (ON) was widened to 18 deg.

Therefore, it can be seen that the width of the light 94 can be widened the most when using the driving method in which a voltage is applied between the comb-shaped electrode 37 and the comb-shaped electrode 38 of the diffractive optical element 13 and the common electrode 34 (refer to FIG. 7(B)). On the other hand, it can be seen that the change in the width of the light 94 is smallest when using the driving method in which a voltage is applied between the comb-shaped electrode 37 and the comb-shaped electrode 38 of the diffractive optical element 13 and the counter electrode 35 (refer to FIG. 7(C)).

Here, in order to confirm the diffractive effect, in a case where the light source 90 in the optical system of FIG. 6 is replaced with a laser light source, and the diffractive optical element 13 is driven by applying a voltage between the comb-shaped electrode 37 and the comb-shaped electrode 38 and the common electrode 34, it was possible to confirm that diffraction spots of first order or higher light were obtained on the screen 93, and that a diffractive effect was occurring.

Next, an observation example of the projection light emitted from the projection lens 18 when the diffractive optical element 13 manufactured under the same conditions as those used in the above evaluation is being incorporated into the vehicle lamp system shown in FIG. 1 and operated will be described. Here, a driving voltage was applied to the liquid crystal element 15 so that the entire surface becomes a light-transmitting state. As shown in the schematic conical diagram of FIG. 9, the light emitted from the light source 11, collected by the reflector 12, and incident on the diffractive optical element 13 is incident at a wide angle with a maximum collection angle of ±40° to 50°, and the light is incident from a substantially normal direction near the light modulation region 30*b* disposed in the center of the diffractive optical element 13. The diffractive optical element 13 is disposed so that the arrangement direction of each light modulation region 30*a* to 30*c* coincides with the left-right direction of the vehicle lamp system.

FIG. 10(A) to FIG. 10(C) are diagrams showing measurement examples of the light intensity distribution of the projection light. In these measurement examples, the light intensity distribution was measured with a screen placed 10 m forward of the projection lens 18. Each measurement example in FIG. 10(A) to FIG. 10(C) shows a roughly elliptical light intensity distribution extending to the left and right, with the area of higher brightness toward the center of the elliptical distribution.

FIG. 10(A) shows light intensity distribution when no driving voltage is applied to the diffractive optical element 13. In this case, the light intensity distribution is similar to when the diffractive optical element 13 is not placed, and is substantially symmetrical.

FIG. 10(B) shows light intensity distribution when a driving voltage is applied to the left side light modulation region 30*a* of the diffractive optical element 13, and no driving voltage is applied to the other light modulation regions 30*b* and 30*c*. In this case, as can be seen from a comparison with the light intensity distribution in FIG. 10(A), the projection light is shifted by about 3° to the right in the figure. Here, note that the projection lens 18 inverts the transmitted light vertically and horizontally, so the position of the light modulation region 30*a* and the direction of movement of the projection light are reversed.

FIG. 10(C) shows light intensity distribution when a drive voltage is applied to each light modulation region 30*a* to 30*c* in the diffractive optical element 13. In this case, as can be seen from a comparison with the light intensity distribution in FIG. 10(A), the projection light spreads to the left and right in the figure.

Here, by ensuring a larger distance between the diffractive optical element 13 and the liquid crystal element 15, the degree of movement and spread of light can be further increased.

Figure 11A:
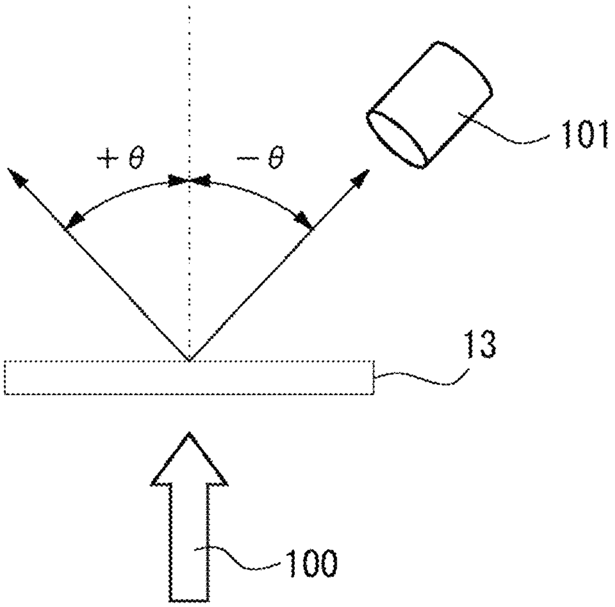
FIG. 11(A) and FIG. 11(B) are diagrams for explaining a measurement system used to measure the transmittance of a diffractive optical element.
Figure 11B:
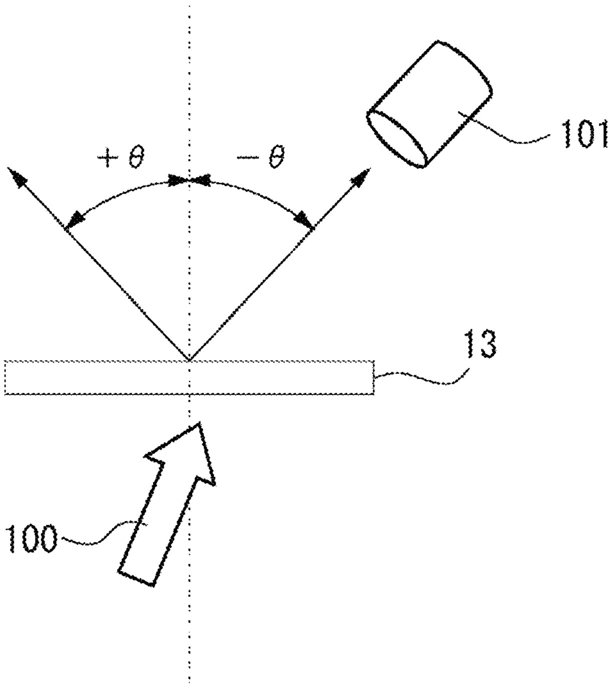

Next, the light distribution control of the diffractive optical element 13 will be described in more detail. As shown in FIG. 11(A), parallel light 100 was incident on the diffractive optical element 13 from the normal direction of the incident surface (projection angle=0°), and the transmittance was measured by the light receiving element 101 when the voltage applied between each comb-shaped electrode 37, 38 of the diffractive optical element 13 and the common electrode 34 was set between 0V and 30V. Similarly, as shown in FIG. 11(B), parallel light 100 with a projection angle greater than 0° with respect to the normal direction of the incident surface was incident on the diffractive optical element 13, and the transmittance was measured by the light receiving element 101 when the voltage applied between each comb-shaped electrode 37, 38 of the diffractive optical element 13 and the common electrode 34 was set between 0 V and 30 V. The light receiving element 101 was set to have a variable light receiving angle θ with respect to the normal direction of the diffractive optical element 13 in the positive and negative directions.

Figure 12A:
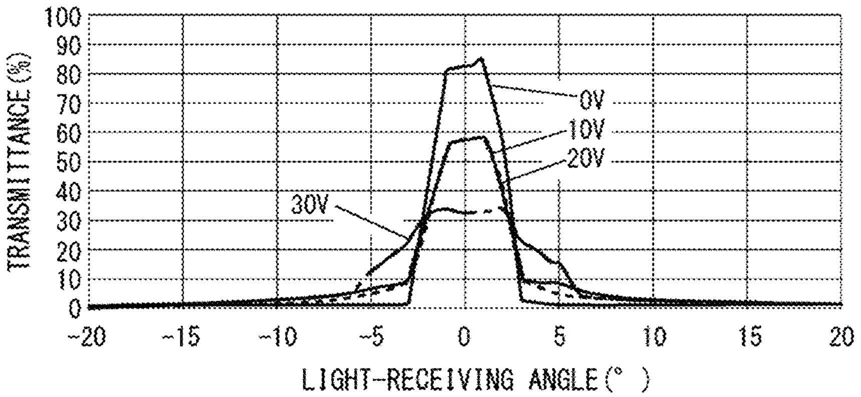
FIG. 12(A) is a graph showing the relationship between the light-receiving angle and transmittance when the projection angle of the incident parallel light is 0°.

FIG. 12(A) is a graph showing the relationship between a light-receiving angle and transmittance when the projection angle of the incident parallel light is 0°. When the voltage applied to the diffractive optical element 13 is 10V and 20V, the characteristics are nearly the same, so the characteristic lines almost overlap. As shown in the figure, the transmittance of light traveling straight in the direction of the light-receiving angle=0° is approximately 85% when the applied voltage is 0V, and by increasing the applied voltage, the transmittance decreases to about 30%, and it can be seen that the transmittance expands to the left and right (directions in which the absolute value of the light-receiving angle is larger).

Figure 12B:
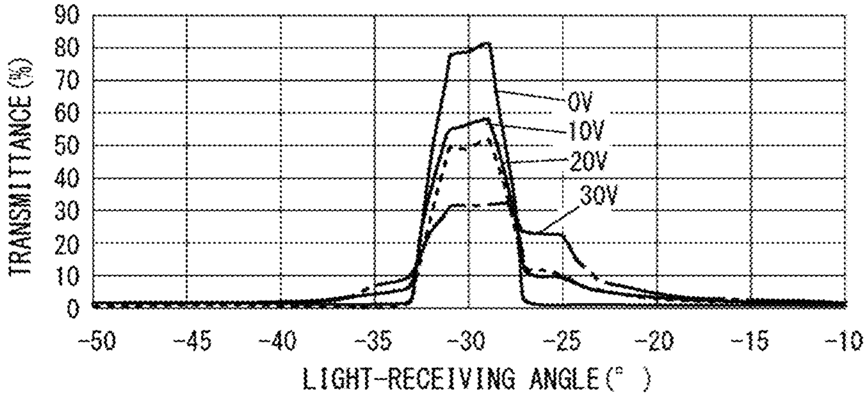
FIG. 12(B) is a graph showing the relationship between the light-receiving angle and transmittance when the projection angle of the incident parallel light is ±30°.

FIG. 12(B) is a graph showing the relationship between the light-receiving angle and transmittance when the projection angle of the incident parallel light is ±30°. A positive projection angle means that parallel light is incident from the direction as shown in FIG. 11(B) described above. The transmittance of light traveling straight in the direction of a light-receiving angle of −30° is approximately 80% when the applied voltage is 0V, and by increasing the applied voltage, the transmittance decreases to about 30%, and it can be seen that the transmittance expands mainly to the left (light-receiving angle in the positive direction).

Figure 12C:
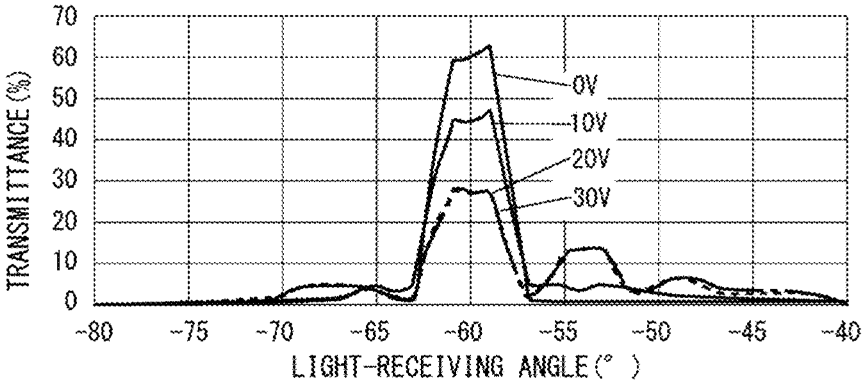
FIG. 12(C) is a graph showing the relationship between the light-receiving angle and transmittance when the projection angle of the incident parallel light is ±60°.

FIG. 12(C) is a graph showing the relationship between the light-receiving angle and transmittance when the projection angle of the incident parallel light is ∓60°. A positive projection angle means that parallel light is incident from the direction as shown in FIG. 11(B) described above. The transmittance of light traveling straight in the direction of a light-receiving angle of −60° is approximately 60% when the applied voltage is 0V, and by increasing the applied voltage, the transmittance decreases to about 30%, and it can be seen that the transmittance expands mainly to the left (light-receiving angle in the positive direction).

Figure 13A:
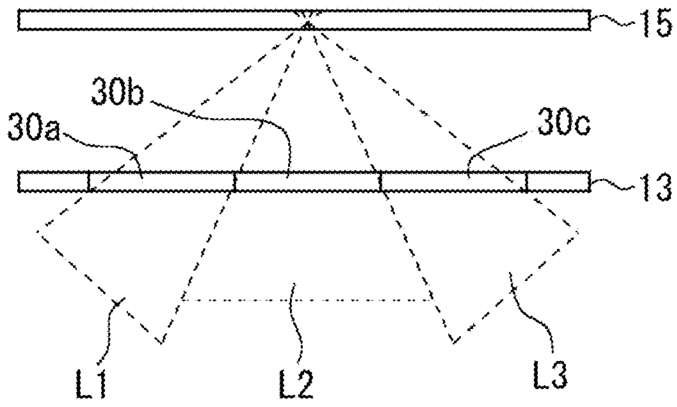
FIG. 13(A) to FIG. 13(C) are diagrams that schematically show the state of light that is subjected to the diffractive effect by a diffractive optical element and enters a liquid crystal element.
Figure 13B:
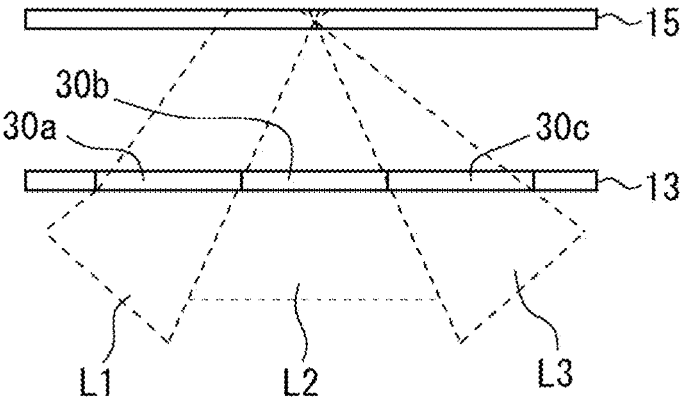
Figure 13C:
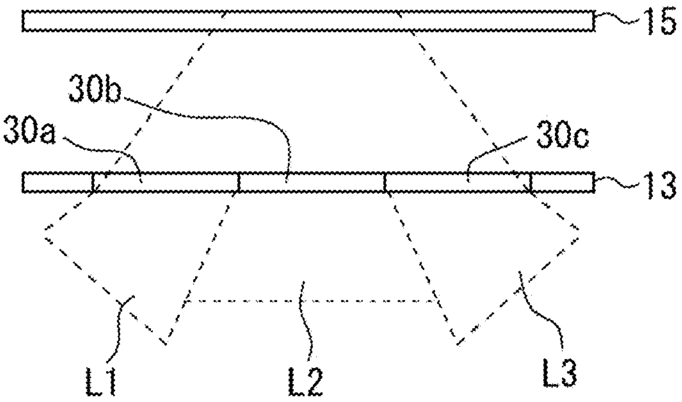

FIG. 13(A) to FIG. 13(C) are diagrams that schematically show the state of light that is subjected to the diffractive effect by a diffractive optical element and enters a liquid crystal element. In each figure, light that is collected at the position of the liquid crystal element 15 (light traveling from bottom to top in the figure) is divided into three lights L1, L2, and L3, each of which is shown by a dotted line, for convenience. Light L1 is light that mainly enters each light modulation region 30*a* of the diffractive optical element 13, light L2 is light that mainly enters each light modulation region 30*b* of the diffractive optical element 13, and light L3 is light that mainly enters each light modulation region 30*c* of the diffractive optical element 13.

When no voltage is applied to any of the light modulation regions 30*a* to 30*c* of the diffractive optical element 13 as shown in FIG. 13(A), light L1 to L3 emitted from the light source 11 and collected by the reflector 12 passes directly through the diffractive optical element 13 and enters the liquid crystal element 15, forming a focal point at the position of the liquid crystal element 15.

Further, when a voltage is applied only to the light modulation region 30*a* of the diffractive optical element 13 as shown in FIG. 13(B), light L1 incident on this light modulation region 30*a* spreads and bends and then enters the liquid crystal element 15. Other lights L2 and L3 are incident onto the liquid crystal element 15 as they are. Therefore, the projection light that passes through the liquid crystal element 15 and is projected by the projection lens 18 is irradiated spreading to the left side in the figure.

Here, although not shown, the same occurs when a voltage is applied only to the light modulation region 30*c* of the diffractive optical element 13. In this case, light L3 entering the light modulation region 30*c* spreads and bends and then enters the liquid crystal element 15. Other lights L1 and L2 are incident on the liquid crystal element 15 as they are. Therefore, the projection light that passes through the liquid crystal element 15 and is projected by the projection lens 18 is irradiated spreading to the right side in the figure.

Further, when a voltage is applied to all of the light modulation regions 30*a* to 30*c* of the diffractive optical element 13 as shown in FIG. 13(C), lights L1 to L3 emitted from the light source 11 and collected by the reflector 12 each spreads to the left and right and then enters the liquid crystal element 15. Therefore, the projection light that passes through the liquid crystal element 15 and is projected by the projection lens 18 is irradiated spreading to the left and right in the figure.

In this way, since the degree of spread of the projection light can be controlled using each light modulation region 30*a* to 30*c*, for example, when the vehicle traveling speed is relatively high such as when traveling on a highway, the projection light does not spread but is concentrated in the front direction of the vehicle, and on the other hand, when the vehicle traveling speed is relatively low such as when traveling in an urban area, the projection light spreads to the left and right, thereby a light distribution state according to the traveling situation is realized and the visibility in front of the vehicle can be improved. Further, by selectively using the diffraction effect of either the light modulation region 30*a* or 30*c*, for example, the light irradiated to the left front or right front of the vehicle can be increased depending on the traveling direction of the vehicle, thereby the visibility in the traveling direction of the vehicle can be improved.

Figure 14A:
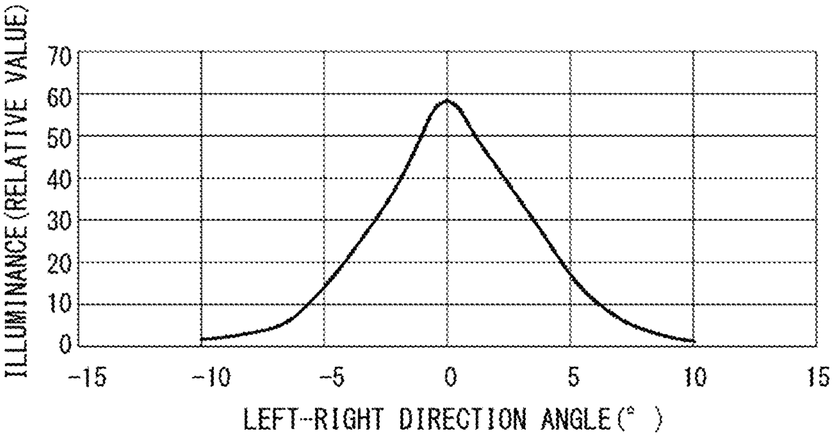
FIG. 14(A) is a diagram showing an example of illuminance distribution of the projection light when no voltage is applied to the diffractive optical element.

FIG. 14(A) is a diagram showing an example of illuminance distribution of the projection light when no voltage is applied to the diffractive optical element. In the state where diffractive effect of the diffractive optical element 13 is not used, illuminance distribution is substantially symmetrical about the reference position of 0° in the left-right direction angle, as shown in the figure.

Figure 14B:
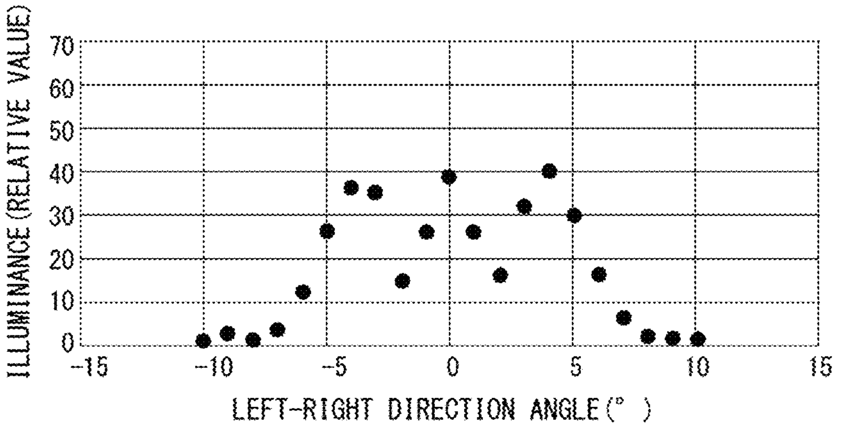
FIG. 14(B) is a diagram showing calculation result of illuminance distribution of the projection light when a voltage is applied to all light modulation regions of the diffractive optical element.

FIG. 14(B) is a diagram showing calculation result of illuminance distribution of the projection light when a voltage is applied to all light modulation regions of the diffractive optical element. Here, the calculation was performed assuming that the mutual distance between the diffractive optical element 13 and the liquid crystal element 15 was 8 mm. This mutual distance corresponds to the case where the incident angle of light passing through light modulation region 30*a* of the diffractive optical element 13 and incident on the center of liquid crystal element 15 is 45°. As shown in the figure, it can be seen that, by applying a voltage to all the light modulation regions 30*a* to 30*c*, high illuminance band is spread out to the left and right. At this time, the intensity of the light striking the center of the liquid crystal element 15 is reduced to about ⅔, and the light is spread to the left and right by about ±5°.

Figure 14C:
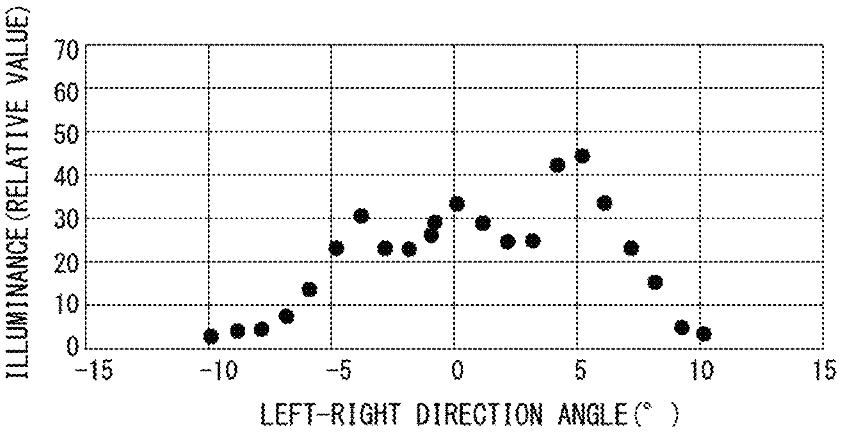
FIG. 14(C) is a diagram showing calculation result of illuminance distribution of the projection light when voltage is applied to one of the light modulation regions of the diffractive optical element.

FIG. 14(C) is a diagram showing calculation result of illuminance distribution of the projection light when a voltage is applied to one of the light modulation regions of the diffractive optical element. Here, the calculation was performed assuming that the mutual distance between the diffractive optical element 13 and the liquid crystal element 15 was 8 mm. In this case, it can be seen that high illuminance band moves to about ±5°. Here, it is possible to increase the angle by which the high illuminance band moves by setting a larger distance between the diffractive optical element 13 and the liquid crystal element 15. For example, when the distance is set to 20 mm, the high illuminance band is expected to move to about ±12.5°. This value can satisfy the deflection angle required for AFS (Adaptive Front-Lighting System) technology, which variably controls the light irradiation direction according to the traveling direction of the vehicle.

According to the above-described embodiment, it is possible to realize diversification of light distribution control of irradiation light in a lighting apparatus such as a vehicle lamp or a system that uses such lighting apparatus.

Here, the present disclosure is not limited to the content of the embodiment described above, and can be implemented with various modifications within the scope of the gist of the present disclosure. For example, the number of light modulation regions of the diffractive optical element 13 is not limited to three as illustrated. In the above embodiment, the light modulation regions are arranged in one direction, but they may be arranged in two directions. Further, in the above embodiment, the diffractive optical element 13 is disposed between the light source 11 and the polarizer 14, but the diffractive optical element 13 may be disposed between the polarizer 14 and the liquid crystal element 15. Here, the former arrangement is more preferable because it is possible to ensure a relatively large distance between the diffractive optical element 13 and the liquid crystal element 15.

Further, in the above-described embodiment, a four-wheel vehicle has been described as an example, but the technical idea of the present disclosure can be applied to the headlights of various vehicles other than four-wheel vehicles. Further, in the above-described embodiment, a vehicle lamp is illustrated as an example of a lighting apparatus, but the present disclosure is not limited thereto. For example, the content of the present disclosure can be applied to a lighting apparatus for drawing various images, such as on road surfaces, street lights, railroad crossing signals, direction guides. Further, in the case of a vehicle lamp where the projection light spreads to the left and right as exemplified in FIGS. 10A to 10C, with regard to the bright area spreading in the horizontal direction, it is desirable that the light moves to the left and right while maintaining its bright state. For this reason, comb-tooth electrodes used in the diffractive optical element were in a form of straight slit shape. When other uses (such as a lighting apparatus) are assumed, a comb-shaped electrode with a slit direction changed with respect to the direction of the light incident on the diffractive optical element may be used. For example, when light is incident from the direction as shown in FIG. 9, the electrodes in the light modulation region 30*b* may be horizontal slit electrodes, and the electrodes in the light modulation region 30*a* may be "L" shaped slit electrodes. Further, various comb-shaped electrode structures such as U-shaped, concentric, and elliptical may be used.

The present disclosure has features as appended below.

Appendix 1

A lighting apparatus including:

a light source;

a light condensing unit that condenses light emitted from the light source;

a liquid crystal element disposed in a focal position of the light that is condensed by the light condensing unit;

a projection lens disposed in a position at which the light that passes through the liquid crystal element can enter;

a first polarizer disposed between the light source and the liquid crystal element;

a second polarizer disposed between the liquid crystal element and the projection lens; and a diffractive optical element disposed between the light source and the liquid crystal element;

where the diffractive optical element has a plurality of light modulation regions that are individually capable of electrically switching between a first state in which the refractive index changes periodically or continuously and a second state in which the refractive index is substantially uniform, where, in the first state, a diffractive effect can be generated with respect to an entering light, and where each of the plurality of light modulation regions is disposed at a position at which the light can enter, said position being closer to the light source than the focal position.

Appendix 2

The lighting apparatus according to Appendix 1, where the diffractive optical element is disposed between the light source and the first polarizer.

Appendix 3

The lighting apparatus according to Appendix 1, where the diffractive optical element is disposed between the first polarizer and the liquid crystal element.

Appendix 4

The lighting apparatus according to any one of Appendices 1 to 3, where each of the plurality of light modulation regions of the diffractive optical element includes:

a liquid crystal layer provided between a first substrate and a second substrate disposed opposite each other, and a comb-shaped electrode provided on the first substrate so as to overlap the liquid crystal layer in a plane view.

Appendix 5

The lighting apparatus according to Appendix 4, where each of the plurality of light modulation regions of the diffractive optical element includes:

a common electrode provided on one surface side of the first substrate facing the liquid crystal layer and closer to the one surface side than the comb-shaped electrode, and disposed so as to overlap the comb-shaped electrode in a plane view; and an insulating film disposed between the comb-shaped electrode and the common electrode.

Appendix 6

The lighting apparatus according to Appendix 5, where each of the plurality of light modulation regions of the diffractive optical element includes:

a counter electrode provided on one surface side of the second substrate facing the liquid crystal layer and disposed to overlap the comb-shaped electrode in a plane view.

Appendix 7

The lighting apparatus according to any one of Appendices 4 to 6, where the comb-shaped electrode has a plurality of electrode branches, and where each of the plurality of electrode branches has a width of 5 μm or less and the mutual distance between adjacent electrode branches is 5 μm or less.

Appendix 8

A vehicle lamp system including:

a vehicle lamp configured using the lighting apparatus according to any one of Appendices 1 to 7, and a controller connected to the vehicle lamp, the controller controlling the operation of the liquid crystal element of the vehicle lamp and the operation of the diffractive optical element in accordance with the conditions around a vehicle.

REFERENCE SIGNS LIST

1: Vehicle lamp (Lighting apparatus)
2: Controller
3: Camera
11: Light source
12: Reflector (Reflective member)
13: Diffractive optical element
14: Polarizer
15: Liquid crystal element,
16: Optical compensator
17: Polarizer
18: Projection lens
30*a*, 30*b*, 30*c*: Light modulation region
32: First substrate
33: Second substrate
34: Common electrode
35: Counter electrode
36: Insulating film
37, 38: Comb-shaped electrode
39, 40: Alignment film
41: Liquid crystal layer

The invention claimed is:

1. A lighting apparatus comprising:

a light source;

a light condensing unit that condenses light emitted from the light source;

a liquid crystal element disposed in a focal position of the light that is condensed by the light condensing unit;

a projection lens disposed in a position at which the light that passes through the liquid crystal element can enter;

a first polarizer disposed between the light source and the liquid crystal element;

a second polarizer disposed between the liquid crystal element and the projection lens; and a diffractive optical element disposed between the light source and the liquid crystal element;

wherein the diffractive optical element has a plurality of light modulation regions that are individually capable of electrically switching between a first state in which the refractive index changes periodically or continuously and a second state in which the refractive index is substantially uniform, wherein, in the first state, a diffractive effect can be generated with respect to an entering light, and wherein each of the plurality of light modulation regions is disposed at a position at which the light can enter, said position being closer to the light source than the focal position.

2. The lighting apparatus according to claim 1, wherein the diffractive optical element is disposed between the light source and the first polarizer.

3. The lighting apparatus according to claim 1, wherein the diffractive optical element is disposed between the first polarizer and the liquid crystal element.

4. The lighting apparatus according to claim 1, wherein each of the plurality of light modulation regions of the diffractive optical element comprises:

a liquid crystal layer provided between a first substrate and a second substrate disposed opposite each other, and a comb-shaped electrode provided on the first substrate so as to overlap the liquid crystal layer in a plane view.

5. The lighting apparatus according to claim 4, wherein each of the plurality of light modulation regions of the diffractive optical element comprises:

a common electrode provided on one surface side of the first substrate facing the liquid crystal layer and closer to the one surface side than the comb-shaped electrode, and disposed so as to overlap the comb-shaped electrode in a plane view; and an insulating film disposed between the comb-shaped electrode and the common electrode.

6. The lighting apparatus according to claim 5, wherein each of the plurality of light modulation regions of the diffractive optical element comprises:

a counter electrode provided on one surface side of the second substrate facing the liquid crystal layer and disposed to overlap the comb-shaped electrode in a plane view.

7. The lighting apparatus according to claim 4, wherein the comb-shaped electrode has a plurality of electrode branches, and wherein each of the plurality of electrode branches has a width of 5 μm or less and the mutual distance between adjacent electrode branches is 5 μm or less.

8. A vehicle lamp system comprising:

a vehicle lamp configured using the lighting apparatus according to claim 1, and a controller connected to the vehicle lamp, the controller controlling the operation of the liquid crystal element of the vehicle lamp and the operation of the diffractive optical element in accordance with the conditions around a vehicle.

* * * * *